(12) United States Patent
Bittner et al.

(10) Patent No.: US 7,119,266 B1
(45) Date of Patent: Oct. 10, 2006

(54) ELECTRONIC MUSIC DISPLAY APPLIANCE AND METHOD FOR DISPLAYING MUSIC SCORES

(76) Inventors: Martin C. Bittner, 957 Wilmington Way, Redwood City, CA (US) 94062; Jeffery D. Rector, 600 Grand View Ave. #5, San Francisco, CA (US) 94114

( * ) Notice: Subject to any disclaimer, the term of this patent is extended or adjusted under 35 U.S.C. 154(b) by 426 days.

(21) Appl. No.: 10/443,553

(22) Filed: May 21, 2003

(51) Int. Cl.
*G09B 15/00* (2006.01)
*G09B 15/02* (2006.01)
*G10H 1/00* (2006.01)

(52) U.S. Cl. .................................. 84/477 R; 84/483.1
(58) Field of Classification Search .............. 84/470 R, 84/477 R, 478
See application file for complete search history.

(56) References Cited

U.S. PATENT DOCUMENTS

| | | | |
|---|---|---|---|
| 4,350,070 A | 9/1982 | Bahu | |
| 5,400,687 A | 3/1995 | Ishii | |
| 5,665,927 A | 9/1997 | Taki et al. | |
| 5,689,077 A | 11/1997 | Jasinski | |
| 5,728,960 A | 3/1998 | Sitrick | |
| 5,760,323 A | 6/1998 | Romero et al. | |
| 5,773,741 A | 6/1998 | Eller et al. | |
| 6,051,769 A | 4/2000 | Brown, Jr. | |
| 6,072,114 A * | 6/2000 | Kunimasa | 84/477 R |
| 6,348,648 B1 | 2/2002 | Connick, Jr. | |
| 6,380,471 B1 | 4/2002 | Matsumoto | |
| 6,392,132 B1 * | 5/2002 | Uehara | 84/477 R |
| 6,414,231 B1 | 7/2002 | Miyamoto et al. | |
| 6,483,019 B1 | 11/2002 | Hamilton | |
| 6,635,815 B1 * | 10/2003 | Kosakaya et al. | 84/471 R |
| 2001/0022127 A1 | 9/2001 | Chiurazzi et al. | |
| 2004/0159212 A1 * | 8/2004 | Terada | 84/477 R |

OTHER PUBLICATIONS

C. Graefe, D. Wahila, J. McGuire, O. Dasna, Designing the MUSE: a digital music stand for the symphony musician, Proceedings of the SIGCHI Conf. on Human Factors in Computing Systems, [online], [retrieved on Nov. 14, 2001], retrieved from the internet: http://doi.acm.org/10.1145/238386.238599.

* cited by examiner

*Primary Examiner*—Jeffrey W Donels
(74) *Attorney, Agent, or Firm*—Carolyn T. Koenig; Mark S. Koenig

(57) ABSTRACT

An apparatus and a method for electronically displaying music scores use a music object file format to store and display music scores. A music score file is translated into a music object file. The music object file includes music data structures that correspond to notation objects that represent music symbols of a music score. The measure is the fundamental grouping unit. The music data structures are processed to form a page image that includes the notation objects of the music symbols to be displayed. An annotation is input to a touch sensitive display using one's finger or a stylus and displayed overlaying the displayed music score. Modifications to a displayed music score include transposing, resizing, expanding, and marking measures.

40 Claims, 11 Drawing Sheets

ELECTRONIC MUSIC DISPLAY APPLIANCE AND METHOD FOR DISPLAYING MUSIC SCORES

BACKGROUND OF THE INVENTION

The present invention relates to an electronic display of music, and more specifically, to an electronic music display appliance and a method for storing and displaying music scores.

Electronic music display devices have been proposed which can display music scores using input music score files with industry standard file formats. These files formats include notational and image based formats that have been developed for composing and publishing music scores on a fixed page size. Image based formats use image data to represent each page of a music score. Well known PNG, TIFF and JPG are representative of image formats. Notational formats use a set of instructions on how to build each page of a music score. The instructions include descriptions of notation elements and their associated location on a page. Well known NIFF and MusicXML are examples of notational formats. Examples of proprietary formats are those used in Finale® and Sibelius™ music composition and publishing programs.

Conventional electronic music display devices use processing methods and file formats that are not well suited for promptly displaying, manipulating, and modifying music scores. Limited capabilities of these devices can prevent practical operations, such as sequentially displaying repeated sections of music, resizing a portion of the music score, displaying a single instrument's part, displaying a single voice and rapidly jumping to an arbitrary measure. Some of the previous devices require the use of a separate computer to convert an original music score data file into another file format used for displaying images of the music score.

SUMMARY OF THE INVENTION

An object of the present invention is an electronic music display appliance (MDA) for display, manipulation, and modification of a music score. The MDA stores music score information in a music object file. The music object file represents the music score using music data structures that correspond to notation objects in the music score. The music data structures are grouped on a measure by measure basis. A measure based group includes the music data structures corresponding to the notation elements in a measure of music. The measure based grouping facilitates access to measures of the music score for display, manipulation, and modification. The music data structures are processed to form a page image that includes the notation objects in a selected portion of the music score for display. The MDA includes a touch sensitive display for displaying a page image and for receiving user input. The MDA manipulates the music score in response to user input. Manipulations include marking the score with annotations, resizing the score for display, jumping to a marked measure and transposing a portion of the music score.

An embodiment of a MDA is a light weight appliance having a LCD display with on screen control and command icons. A touch sensitive screen overlays the LCD display for receiving user input. Inputs can be made using one's finger or a stylus. An internal processor operates on music data structures in response to input commands. A memory stores one or more music object files. Data interfaces include USB and wireless communication capabilities. In a preferred embodiment a remote computer or a foot switch are connected using a USB interface. Multiple MDA's can communicate via a wireless interface. An audio output gives the user the option of listening to the tempo of a given music score. System errors and audio confirmation of command inputs can be selected for audio output. A removable storage module can store music object files.

In another aspect of the invention, conventional notation based music score files are downloaded from a remote computer to the MDA. The MDA parses and translates the downloaded music score file into a measure based music object file. In an embodiment the format for a measure based music object file is the Electronic Music Storage Format (EMSF) described herein.

An aspect of the present invention uses a measure based music object format for efficient processing of music scores. A measure based music object format organizes music score data using the measure as the fundamental grouping unit instead of the printed page. A measure is a unit of music that contains notation objects for all the parts and voices found in the measure. The measure based music object format of the instant invention is not constrained to matching the page and line breaks and is not limited to a fixed display size or resolution.

The EMSF format groups music score information by general score data, page and measure layout, part, staff, staff grouping, and measure data. Measure hierarchy includes parts, then voices, and lastly objects and their associated modifiers.

In an aspect of the present invention, a score analyzer and page builder form a page image of the music score using music data structures extracted from the input music object file. The music object file includes measure based music data structures that correspond to the notation objects in the music score. The active data structures are processed to form a page image that includes the notation objects of the portion of the music score that appear on the displayed page. The LCD display of the device presents the page of music to the user.

In an aspect of the present invention, a touch screen 110 responds to touch inputs to the displayed page by a user's finger or stylus. Modifications to the displayed music score include transposing, annotating, expanding, and marking measures. Navigation inputs allow sequential page turning, jumping to a specified page, measure, or mark. View options include turning different parts on and off, changing the orientation of the page layout, portrait or landscape, and resizing a portion of the displayed score.

An aspect of the present invention includes flexible display options. Portions of the displayed music score can be expanded so that an entire repeat is embedded within the music score beginning at the appropriate calling repeat measure. The user need not jump from page to page to display repeats. Selected portions of the music score may be resized beginning at any measure selected by the user.

In an aspect of the present invention, an annotation is displayed as a separate layer over the displayed music score and is associated with a user specified music object. When inputting an annotation the user also selects a notation object on the displayed page. The annotation is associated with the selected object and stored as bitmap image data along with a pointer to a music data structure corresponding to the notation object and a position relative to an anchor point of the notation object. An annotation is displayed as a separate layer over the displayed music score, allowing the user to turn the annotation on and off as needed.

An aspect of the present invention is a system comprising a plurality of MDA's in communication with each other. In a master-slave mode, each MDA displays the same portion of a music score. The master unit controls what is displayed on a slave unit. Annotations made by the master unit are also displayed on a slave unit.

DETAILED DESCRIPTION

Figure 1:
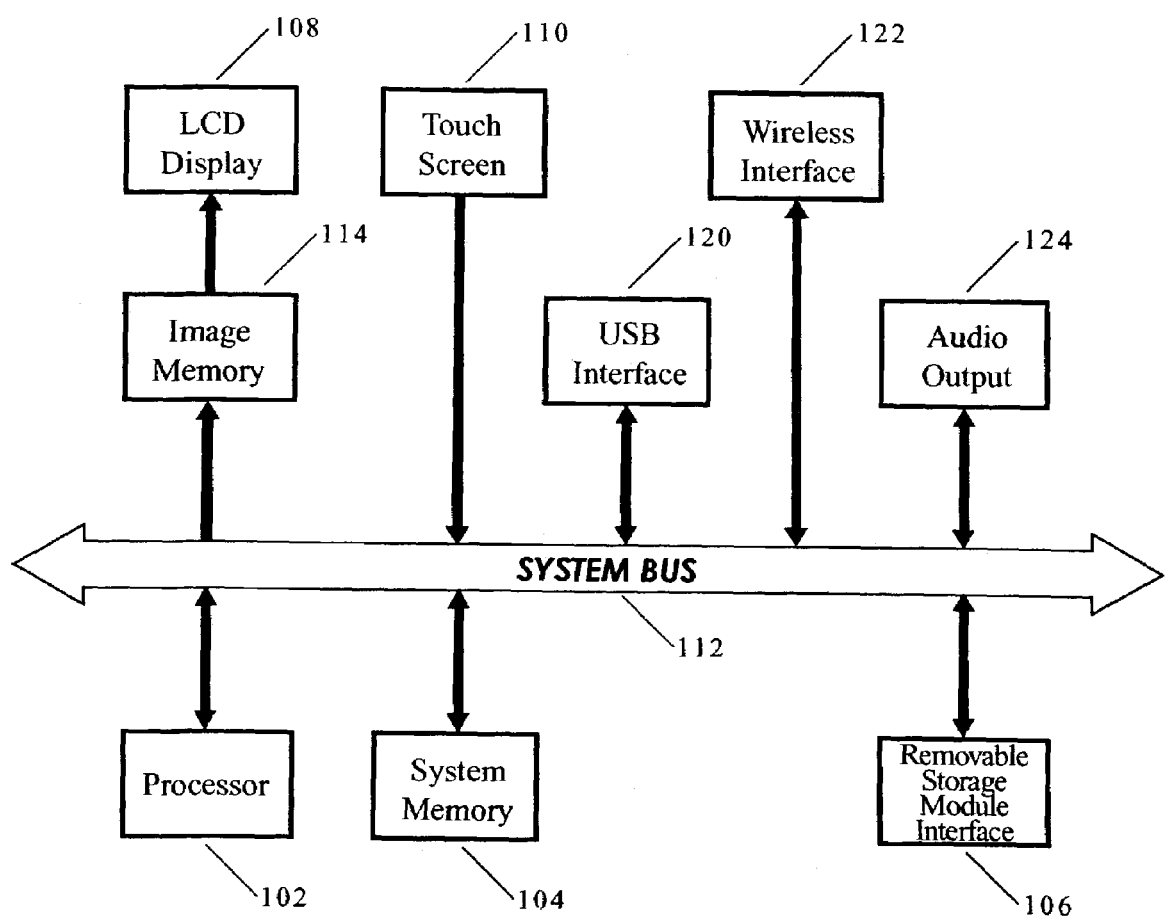
FIG. 1 is a hardware block diagram of a preferred embodiment of a Music Display Appliance (MDA).

FIG. 1 is a functional block diagram of an embodiment of a Music Display Appliance (MDA) 100 according to the present invention. A system bus 112 couples and allows communication between electronic elements found in a MDA 100. A processor 102 controls operations of the Music Display Appliance 100 following operating system and program instructions for processing the preferred Electronic Music Storage Format (EMSF) files 514. Processor 102 translates an input music score file 500 into EMSF files 514. The EMSF files 514 can be stored on a removable storage module.

System memory 104 stores operating system and EMSF based program instructions and a file of notation object templates including musical note, staff, clef, key signature and all other necessary representations of music and system symbols required to represent the music score file 500 and score information 602 on a display 108. The display 108 displays a portion of a music score. Image memory 114 stores page image 919 formed by processor 102 and maps directly to the display 108. In a preferred embodiment, a single physical memory is partitioned into system memory 104 and image memory 114.

Processor 102 constructs a page image 919 for music score by combining notation images corresponding to a notation object. Notation objects represent the music symbols displayed as a music score. Multiple pages of a music score are stored in the image memory 114. These include the current page 920, previous page, and next page for providing prompt display of a selected page. In addition to displaying the music score the display 108 presents score information 602 including page number 222 and measure number 224, tempo 226, score title 228, battery condition 230, date 232 and time 234, as well as icons 202 representing various control and command functions of different operating modes.

Figure 4:
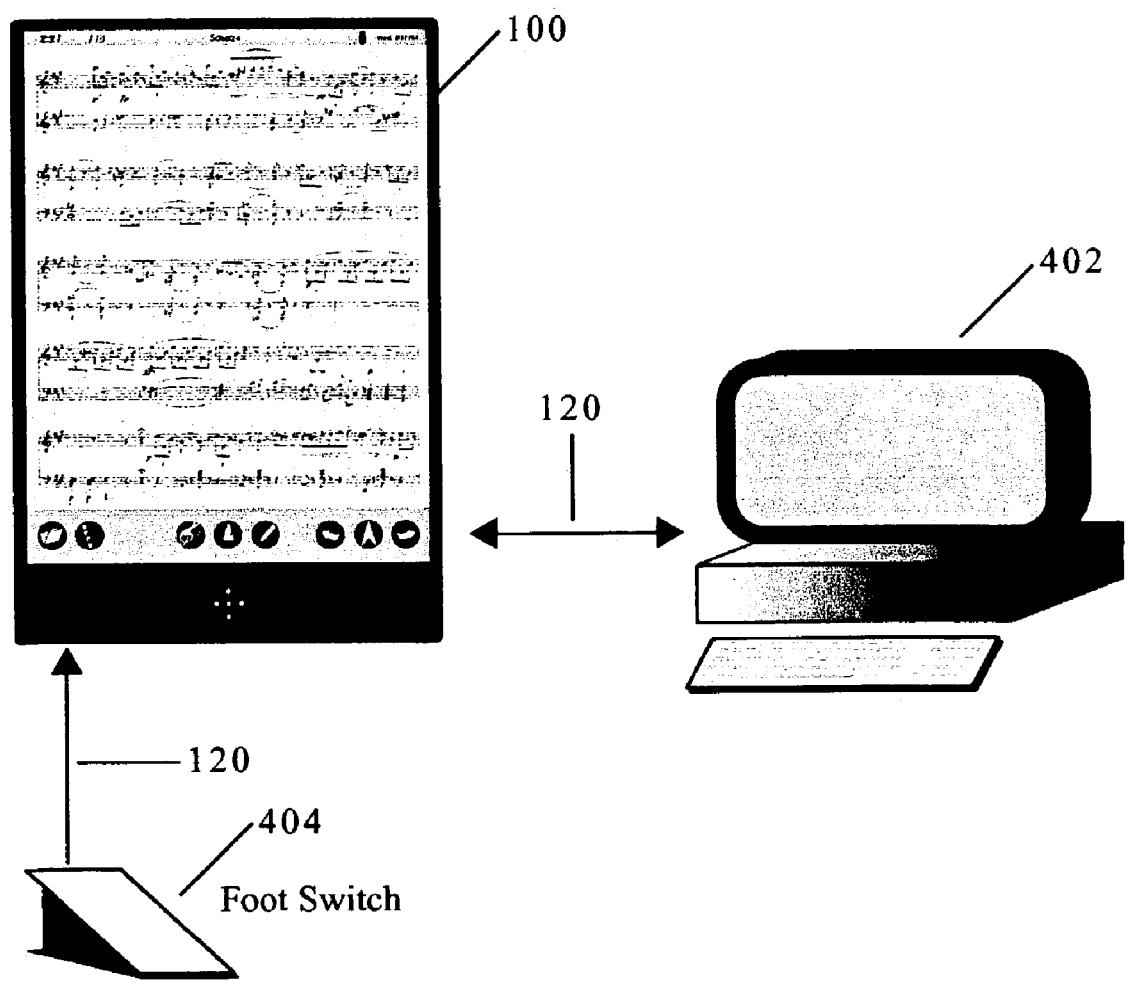
FIG. 4 is a view of a preferred embodiment showing one MDA interfaced to a remote computer and a remote foot switch via a USB interface.
Figure 6:
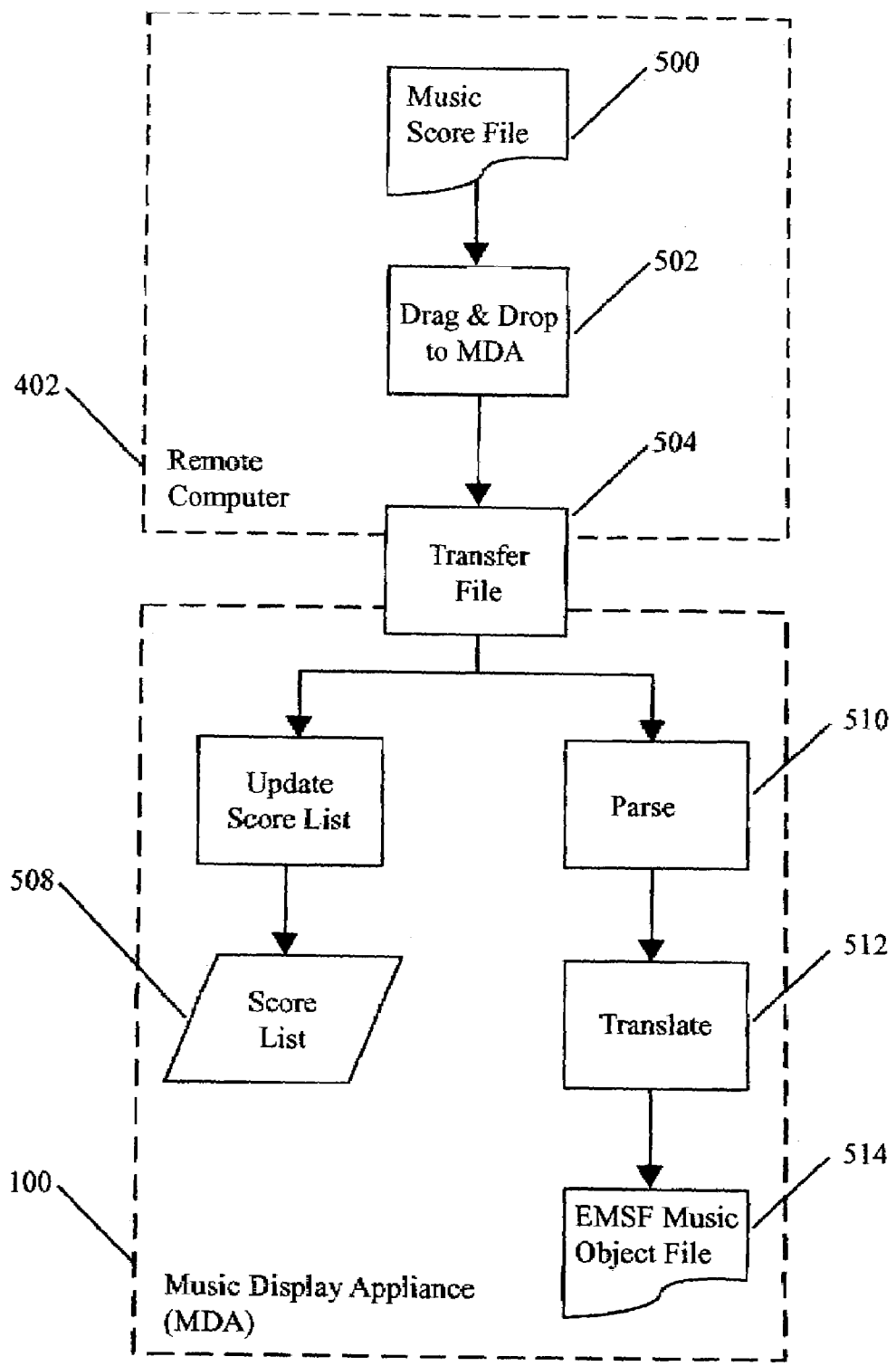
FIG. 6 is a block diagram of a preferred embodiment of a method for transferring music score files from a remote computer to an MDA.

Operation of the MDA 100 includes three modes: File Management mode, Score mode, and Performance mode. Referring to FIGS. 4 and 6, in File Management mode a music score file 500 is transferred 504 from a remote computer 402 to an MDA 100. Music score file 500 is parsed 510 and then translated 512 into an EMSF music object file 514. Score information 602 is entered in a score list 508 file and includes title 228, composer, copyright, and version. The user works on a main list containing play lists as well as all the individual music scores. In the main list new play lists are created or deleted, individual scores deleted or transferred to a remote computer or another MDA 100 unit, or the list may be sorted by any heading. Play lists contain music scores selected by the user for a specific performance. In a play list scores are deleted from the list or reordered. The order in a play list is the order the music scores will be displayed as a performance progresses. To display a selected music score from either the main list or play list the user double taps the selected score or can tap the play score icon using their finger or the stylus 520.

In Score mode the user navigates the music score by turning pages sequentially; jumping to a specified page, mark (user defined jump point) or measure; or jumping between EMSF files 514 listed in the current play list. Also displayed in Score mode are annotation 206, metronome 205, and transpose 204 icons.

Figure 5:
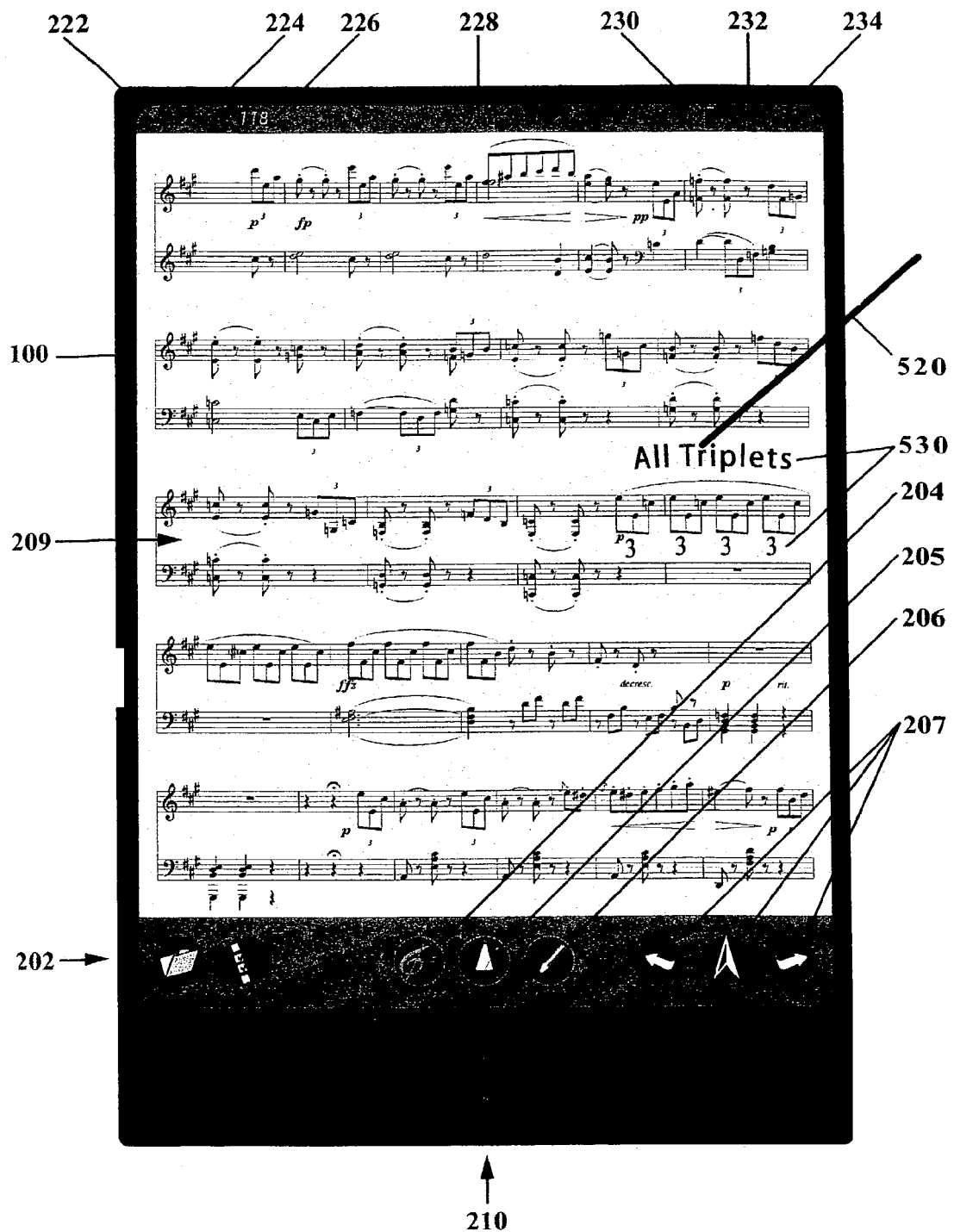
FIG. 5 is a view of a preferred embodiment of an MDA displaying an annotation overlay on a portion of a music score.

Referring to FIG. 5, each annotation 530 is associated with a specified note, measure, word or any other user selected notation object on a displayed page. The built in metronome allows auditory and visual representation of the score tempo 226. For transposing a portion of a music score, processor 102 modifies music data structures from an EMSF file 514. There are several view modes including portrait, landscape and resizing. In performance mode all features except viewing annotation icon 206 and page navigation icons 207 are disabled.

A preferred embodiment of a touch sensitive display 209 includes a touch screen 110 as overlay to the LCD display 108. The touch screen 110 converts touch inputs to signals that the processor 102 converts into input commands for the operating system and EMSF based program instructions. Touch inputs are made using one's finger or a stylus 520. Other input devices could include control buttons integrated into the body of the MDA 100, or an input key pad or keyboard, mouse, or other similar input device coupled to the system bus 112 via a data interface.

Removable storage modules store the translated EMSF files 514. In a preferred embodiment a removable storage media interface 106 accepts compact flash storage modules. Other storage media could include SmartMedia (SM), SecureDigital (SD) cards or other similar removable electronic storage devices known to those skilled in the art.

At least one data interface provides communication with external devices. In a present embodiment these external devices include a remote computer 402, remote MDA 100's, a remote foot switch 404 for navigating the music score, or a remote input device (keypad, or keyboard). Additional page turning means can include cursor, function or other keys on a keyboard or keypad, a remote mouse, joystick, or any other device known to one skilled in the arts. In a preferred embodiment a USB interface 120 and a wireless interface 122, such as IEEE 802.11 "WiFi", are coupled to the processor 102 via system bus 112 for communication with external devices. Other types of interfaces, known to those skilled in the art, could be used including other RF and optical wireless, or direct connections using wires or cables, including Ethernet, firewire, parallel or serial connections.

In a preferred embodiment, audio output 124 includes a speaker 210 and two audio jacks that accept standard headphone jacks. A preferred embodiment outputs audio tempo beats and system related sounds including audio confirmation of touch inputs and error signals. Other embodiments could include audio output 124 of the music score played in synchronization with the displayed music score.

Figure 2:
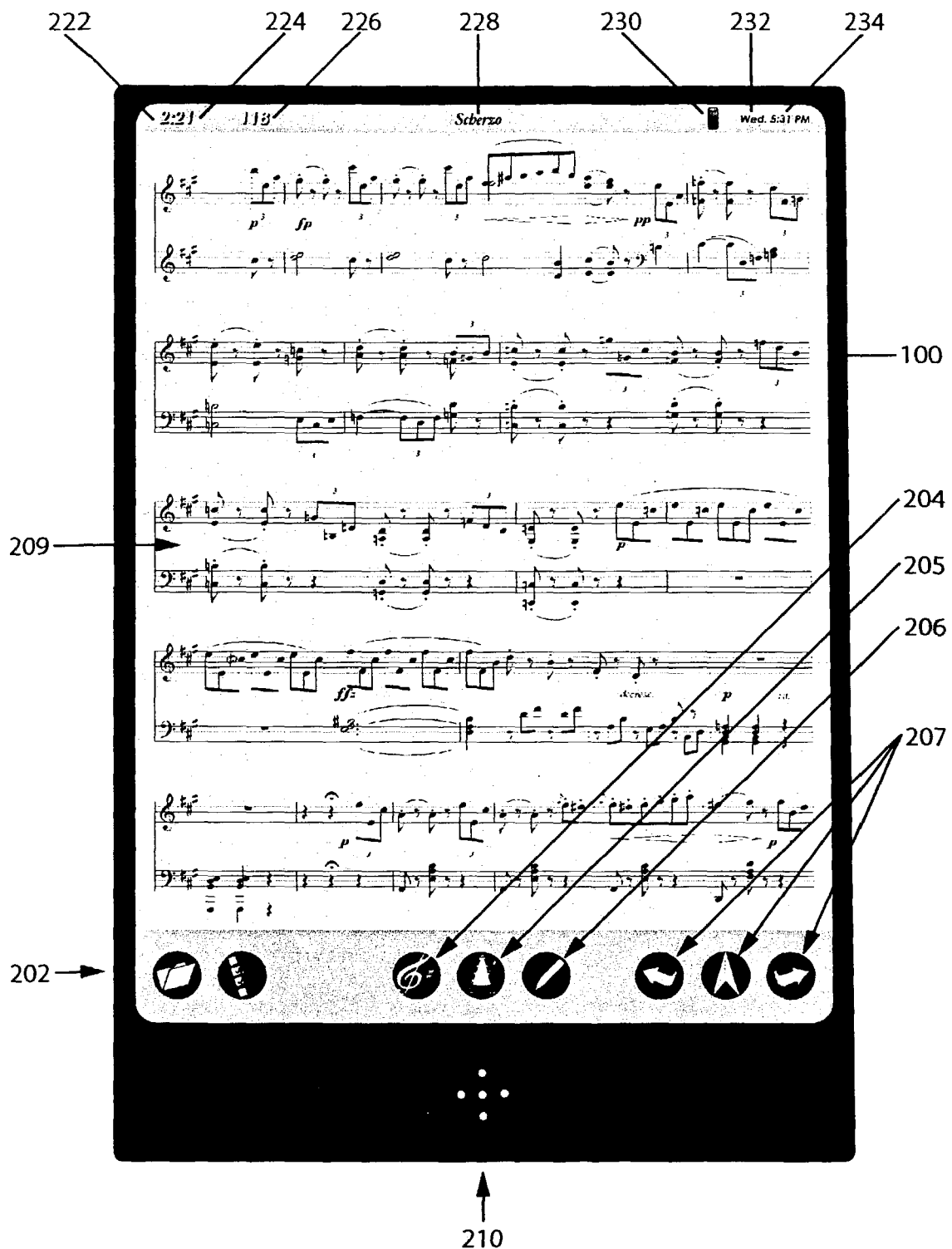
FIG. 2 is a view of a preferred embodiment of the MDA showing a display and locations of various control and command icons, and a speaker.

FIG. 2 is a view of a preferred embodiment of the MDA 100 showing a display 108 and locations of various control and connections. MDA 100 operates in either portrait mode or landscape mode. To accommodate the different physical orientations of the two modes, a preferred embodiment includes two each of audio jacks, USB connectors and power supply connectors on two contiguous sides of the MDA 100. Additional features include a power on/off switch, reset switch and compact flash slot. A speaker 210 is located inside the housing for audio outputs 124. A stylus 520 is stored in a side wall of the housing. The wireless interface 122 is located on one of the other two side walls.

Figure 3:
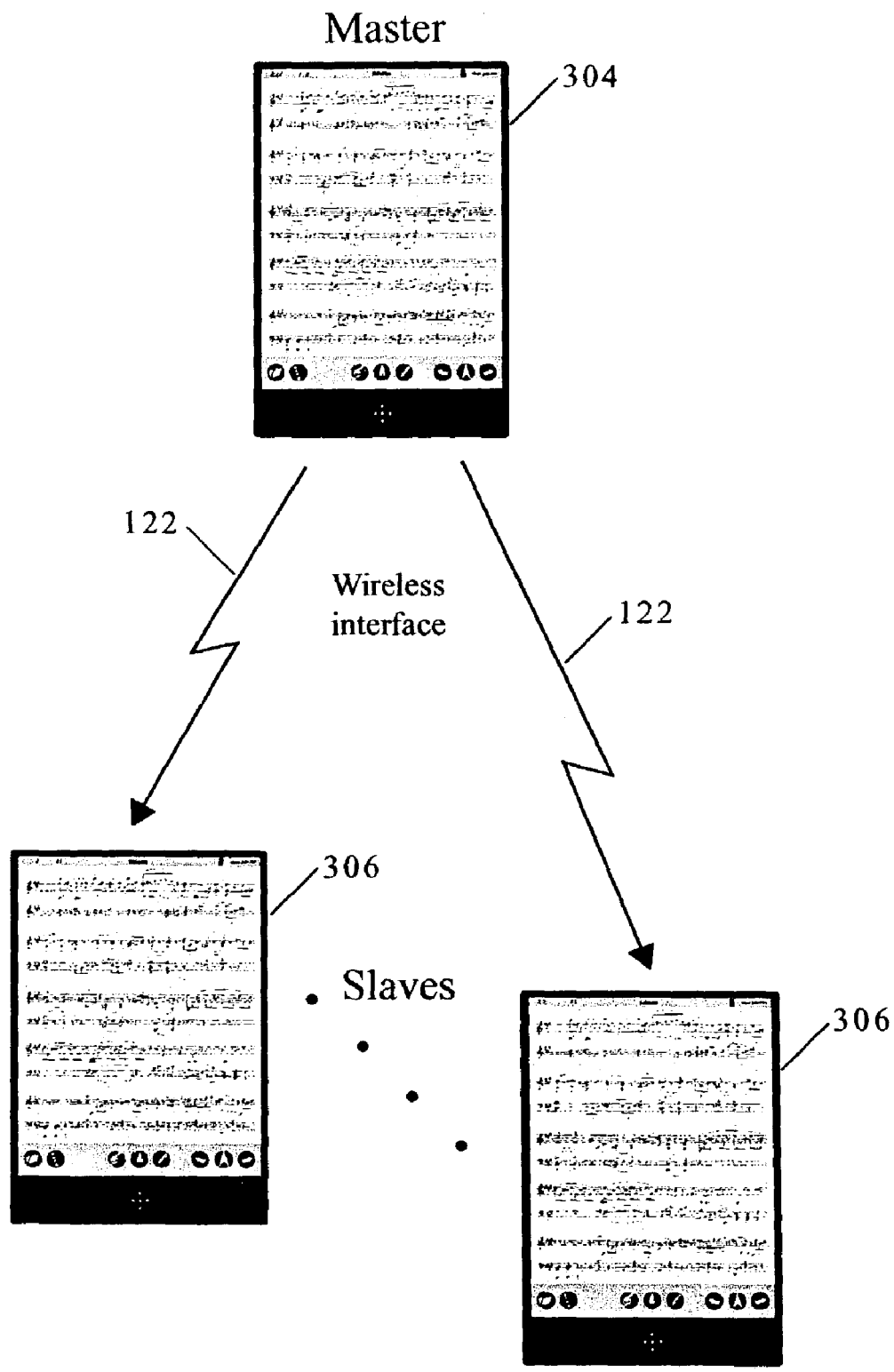
FIG. 3 is a view of a preferred embodiment showing one MDA interfaced to two remote MDA's via a wireless interface.

FIG. 3 shows multiple MDA's 100 communicating with each other using the wireless data interface 122 of a preferred embodiment. One MDA 100 acts a master unit 304 while the others are slave units 306 to the master unit 304. In a simple arrangement, a user input 902 for the master unit 304 is transmitted to and controls the actions of the slave units 306. Annotations 530 made on the master unit 304 are transmitted to and displayed on the slave units 306. A more complex arrangement includes an orchestra setting where slave units 306 are grouped by different instrumental parts 612. The master MDA unit 304 controls the music score displayed on all slave units 306 and can add specific annotations 530 by part. Other arrangements with different control and command functions for the master unit 304 and slave unit 306 are possible and not limited by the above examples.

FIG. 4 is a view of a preferred embodiment showing one MDA 100 interfaced to a remote computer 402 and a footswitch 404 via a USB interface 120. Music score files 500 are transferred 504 to the MDA 100 from the computer 402. The footswitch 404 is used to remotely turn pages of the displayed music score.

In a preferred embodiment an annotation can be added to a displayed page. When inputting an annotation the user selects a notation object on the displayed page. The annotation is associated with the selected notation object. The touch screen 112 senses the input and the processor 108 converts it into bitmap data of the annotation image using techniques that are well known in the art. The processor 102 determines an indicator for the corresponding music data structure which corresponds to the selected object. The processor 102 determines a relative position of the annotation for an anchor point of the selected notation object. The anchor point is a fixed point of reference on a notation object. In a preferred embodiment, the indicator is a pointer to the anchor point in the corresponding music data structure. The processor 102 forms an annotation data structure that includes the annotation's bitmap image data along with the indicator and the relative position. The annotation data structure can be stored in annotation file for later display. The processor 102 forms an annotation image that can be resized. In response to a resizing command, processor 102 uses an associated scale factor to adjust the sizes of the of the displayed notation objects. The processor 102 uses the scale factor to adjust the size of the annotation image and the relative position of the annotation so that the annotation's size and location are appropriate for the resized notation object. Annotations are displayed as a separate layer on LCD display 108.

FIG. 5 shows an example of an annotation 530 displayed with a music score. An annotation 530 is associated with a notation object selected by a user. A user writes an input annotation 530 on the touch screen 112 using a finger or a stylus 204. An annotation 530 moves with its associated notation object when the measure containing the selected notation object is moved to a new location in the music score. An annotation 530 is displayed as a separate layer overlaying the displayed music score 514. The user can turn the annotation layer on and off as needed. Operations for displaying and removing an annotation image are well known to those of ordinary skill in the art and can be implemented without undue experimentation.

FIG. 6 is a block diagram of a preferred embodiment of a method for transferring 504 music score files 500 from a remote computer 402 to an MDA 100. The MDA 100 is presented as a storage device to the computer 402. The user can drag and drop 502 a music score file 500 from the remote computer 402 storage device to the MDA storage icon on the remote computer display. Once the music score file 500 is transferred 504 to the MDA 100 it is parsed 510 and translated 512 into an EMSF file 514. An EMSF file 514 may be exported from any given MDA 100 to other MDA 100 units or to the remote computer 402.

Music score file 500 formats include image based formats, notation based formats and proprietary formats. Image formats are comprised of a plurality of images, with each image representing a page of a music score. Well known image formats include PNG, TIFF and JPG formats. Notation formats include a set of instructions for building each page of a music score. The instructions include notation elements and their associated location on a page. NIFF and MusicXML are well known examples of notational formats. Proprietary formats are used in Finale® and Sibelius™ music composition and publishing programs. A preferred embodiment of the present invention translates notation based formats, such as NIFF or MusicXML files, to the preferred EMSF file 514 format. Other file notation formats could be translated 512 to EMSF files 514 and the additional Property and/or Values included if required in the EMSF format (see Tables 1–12). A music score file 500 with an image based format can be converted into a standard notation based format such as NIFF and MusicXML using special purpose software for a computer 402, as is known to those skilled in the art. The notation based file can then be parsed 510 and translated 512 to an EMSF file 514.

Figure 7:
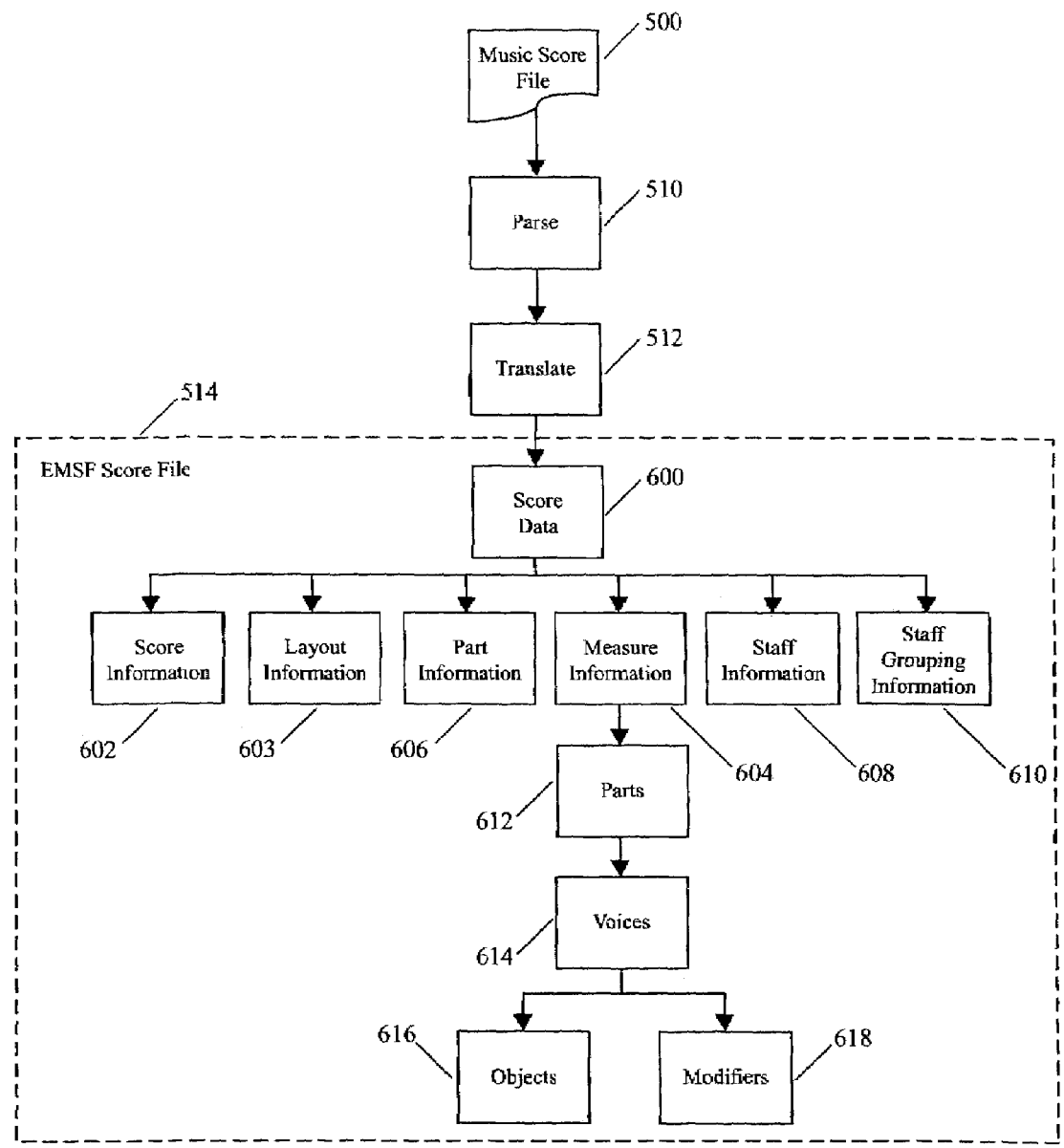
FIG. 7 is a block diagram of a preferred embodiment of a method for translating a music score file to a preferred EMSF file.

FIG. 7 is a block diagram of a preferred embodiment of a method for translating a music score file 500 to a preferred EMSF file 514. The data organization of EMSF format provides flexibility for the display, manipulation, and modification of the music score. The NIFF and MusicXML file formats are well suited for displaying and printing music scores which maintain an existing score layout based on fixed page and line breaks, but lack the flexibility supported by the EMSF format.

The EMSF file 514 has a measure based music data structure that uses the measure of a music score as its fundamental grouping unit. An input music score file 500 is read and its notation elements (noteheads, stems, flags, bars, etc) are grouped to form notation objects representing music symbols which in turn are grouped by measure. The music score file 500 is converted from a list of notation elements based on a fixed page layout for a printed music format into measure based groups of notation objects that retain the logical musical structure of the score. By accessing measure grouped music data structures, the EMSF based program can build pages with different page layouts beginning at any specified measure. The EMSF based program generates different page layouts to resize a portion of a page or to transpose a music file or portion thereof. The EMSF based program accesses music data structures corresponding to individual measures for jumping to a specified measure or marked position in the score. The EMSF based program accesses music data structures corresponding to a musical part 612 or voice 614 for displaying a user selected part 612 or voice 614. A score may be expanded by inserting repeated sections of music which would otherwise require the user to jump to another page to replay that section of the music score. The repeated section of the music score is placed at the appropriate repeat point within the score. Progression through the music score is accomplished by sequentially turning the pages of the score without having to jump back and forth through the music score to comply with repeat symbols.

The music data structures of the EMSF file 514 are closely linked to the active music data structures 912 used by MDA 100 during processing for display. This compatibility eliminates repetition of complex translation steps. Score data 600 are first stripped apart into top level functional groupings of Score Information 602, Layout Information 603, Part Information 606, Measure Information 604, Staff Information 608 and Staff Grouping Information 610. Each voice 614 is subdivided into music objects 616 and a list of music object modifiers 618. With the data structured in this manner the processor 102 can rapidly obtain the information needed to draw a music score starting at any measure boundary within the score. The processor 102 promptly accesses a selected measure data structure and begins building a page image 919 for display.

EMSF files 514 include a hierarchy of chunks structured after the RIFF specification. Each chunk includes a 4-byte Type, a 4-byte Length, and Data which is Length bytes long. The complete file is one large chunk with type SCOR. The file begins with a Header section as shown in Table 1.

TABLE 1

Header Section

| Property/Value | Length (bytes) | Description |
| --- | --- | --- |
| Number of Parts | 4 | Number of musical parts in the score |
| Staff Definitions | 4 | Staff descriptions, number |
| Number of Staff Groupings | 4 | Number of staff groupings present (brackets, braces, lines) |
| Number of Bar Lines | 4 | Number of bar lines in the score |
| Number of Multi-note Modifications | 4 | Number of multi-note modifications in score |
| Number of Measures | 4 | Number of measures in score |
| Offset of Measure List | 4 | Offset in bytes from start of SCOR chunk to a list of offsets for the start locations for each measure's data |
| Base Point Size | 4 | Default symbol point size |
| Title | Arbitrary | A NULL terminated string containing the score title |
| Composer | Arbitrary | A NULL terminated string containing the composer information |
| Copyright | Arbitrary | A NULL terminated string containing the copyright information |
| Version | Arbitrary | A NULL terminated string containing the version information for the file |
| Padding | 0–3 | NULL bytes at the end of the arbitrary-length values to allow next chunk to begin on a 4-byte boundary |
| Measure Offset List | 4 * Number of Measures | A list in which each entry is a 4-byte value containing the offset from the start of the file to the data for each measure. The offset points to the start of each "MEAS" chunk (describe below) |

After the Header section are a series of chunks that comprise the data. Each measure (type MEAS) contains measure level information followed by a series of part chunks (type PART). Each part chunk contains part level information followed by series of voice chunks (type VOIC).

TABLE 2

Data Section (listing of chunk types included in given SCOR chunk)

| Chunk Type | Description |
| --- | --- |
| STAF | Staff descriptions |
| GRPS | Staff grouping descriptions |
| LAYT | Page and measure layout information |
| BRLN | Type of measure ending bar line from original score file |
| DESC | Description of various parts |
| MULT | Multi-note table |
| MEAS | Measure layout data |
| PART | Part descriptions |
| VOIC | Voice descriptions |
| MODS | Single note modifications |

TABLE 3

STAF Chunk

| Property/Value | Length (bytes) | Descriptions |
|---|---|---|
| Staff Number | 2 | ID number of staff |
| Part ID | 2 | ID number of part on current staff |
| Number of Staff Lines | 1 | Number of staff lines on current staff |
| Pad Bytes | 3 | NULL bytes |
| Number of key signature symbols | 1 | Number of symbols that comprise key signature k |
| Position of Each Symbol | Arbitrary | Position of each symbol in staff steps |
| Shape of key signature symbol | Arbitrary | Shape of each key signature symbol |
| Pad Bytes | 0–3 | NULL bytes to allow next chunk to begin on 4-byte boundary |

TABLE 4

GRPS Chunk (description of staff groupings)

| Property/Value | Length (bytes) | Descriptions |
|---|---|---|
| Type of Grouping | 1 | Type of grouping for each staff |
| Starting Staff | 1 | Index of first staffing grouping |
| Ending Staff | 1 | Index of last staff in grouping |
| Grand Staff On/Off | 1 | Off = 0 and On = 1 |

TABLE 5

LAYT Chunk (page and measure layout information updated to most recently displayed page)

| Property/Value | Length (bytes) | Descriptions |
|---|---|---|
| Number of Pages | 4 | Number of pages in original source file, then most recently used after navigating by page |
| Number of Measures | 4 | Number of measures in original source file, then most recently used after navigating by marker |
| Number of Systems | 2 | Total number of systems on page n |
| Starting Measure | 2 | Starting measure (absolute) of page n |
| Starting Measure | 2 | Starting measure (absolute) of system s |
| Ending Measure | 2 | Ending measure (absolute) of system s |
| Number of Staff Groupings | 4 | Number of staff groupings in system s |
| ID of Staff Groupings | 1 | Identification of staff groupings in system s |
| Pad Bytes | 0–3 | NULL bytes to allow next chunk to begin on 4-byte boundary |

TABLE 6

BRLN Chunk (type of measure bar line)

| Property/Value | Length (bytes) | Descriptions |
|---|---|---|
| Measure ID Number | 2 | ID of each bar line |
| Starting Presentation Order | 1 | Staff position of top of bar line |
| Ending Presentation Order | 1 | Staff position of bottom of bar line |

TABLE 7

DESC Chunk (description of various parts)

| Property/Value | Length (bytes) | Descriptions |
|---|---|---|
| Part ID Number | 1 | Identification number for each part |
| Full Name | Arbitrary | Null terminated string |
| Abbreviation | Arbitrary | Null terminated string |
| Pad Bytes | 0–3 | NULL bytes to allow next chunk to begin on 4-byte boundary |

TABLE 8

MULT Chunk (multi-note modification table)

| Property/Value | Length (bytes) | Descriptions |
|---|---|---|
| Measure Index | 4 | Index of measure |
| Part Index | 2 | Index of part |
| Voice Index | 2 | Index of voice |
| Object Index | 4 | Index of object |
| Modification | 2 | Type of each object modification |
| ID of this Modification | 2 | Identification for each object |
| Length of MOD data | 4 | Length of each MOD data section, some fixed and some arbitrary length |
| Pad Bytes | 0–3 | NULL bytes to allow next chunk to begin on 4-byte boundary |

TABLE 9

MEAS Chunk (measure information including repeating PART chunks)

| Property/Value | Length (bytes) | Descriptions |
|---|---|---|
| Measure ID Number | 2 | Identification of each measure |
| Number of Parts | 2 | Number of parts in each measure |
| PART Chunks | Arbitrary | A series of chunks each listing PART descriptions |

TABLE 10

PART Chunk (part information including repeating VOIC chunks)

| Property/Value | Length (bytes) | Descriptions |
|---|---|---|
| Part ID Number | 1 | ID for this part |
| Inclusion & Visibility | 1 | A list showing whether this part is included and if it is visible or not visible |

TABLE 10-continued

PART Chunk (part information including repeating VOIC chunks)

| Property/Value | Length (bytes) | Descriptions |
|---|---|---|
| Number of Voices | 1 | Number of voices in this part |
| Pad Byte | 1 | NULL byte to allow next chunk to begin on 4-byte boundary |
| VOIC Chunks | Arbitrary | A series of chunks each listing VOIC descriptions |

TABLE 11

VOIC Chunk (voice information including repeating object descriptions and MODS chunks)

| Property/Value | Length (bytes) | Descriptions |
|---|---|---|
| Voice Number | 4 | ID for this voice |
| Number of Objects | 4 | Number of musical objects that appear in this voice |
| Start Time of Object e | 2 | Start time of element e relative to start of measure |
| Duration of Object e | 2 | Base duration of Object e |
| Timing Ratio of Object e | 3 | Ratio that when multiplied by base duration gives actual duration of the Object e |
| Staff Number of Object e | 1 | Staff number - index into staff table |
| Object Description | 4 | Object descriptions - one for each object in score |
| MODS Chunks | Arbitrary | A series of chunks each listing modifications to specific objects in this voice |

TABLE 12

MODS Chunk (single note modification data)

| Property/Value | Length (bytes) | Description |
|---|---|---|
| Number of Modifications | 4 | Total number of modifications |
| Tag ID of Modification | 2 | Identification of each modification |
| Object ID of Modification | 2 | Identification of each object |
| Length of MOD data | 4 | Length of MOD data for each modification |
| Pad Bytes | 0–3 | NULL bytes to allow next chunk to begin on 4-byte boundary |

Figure 8:
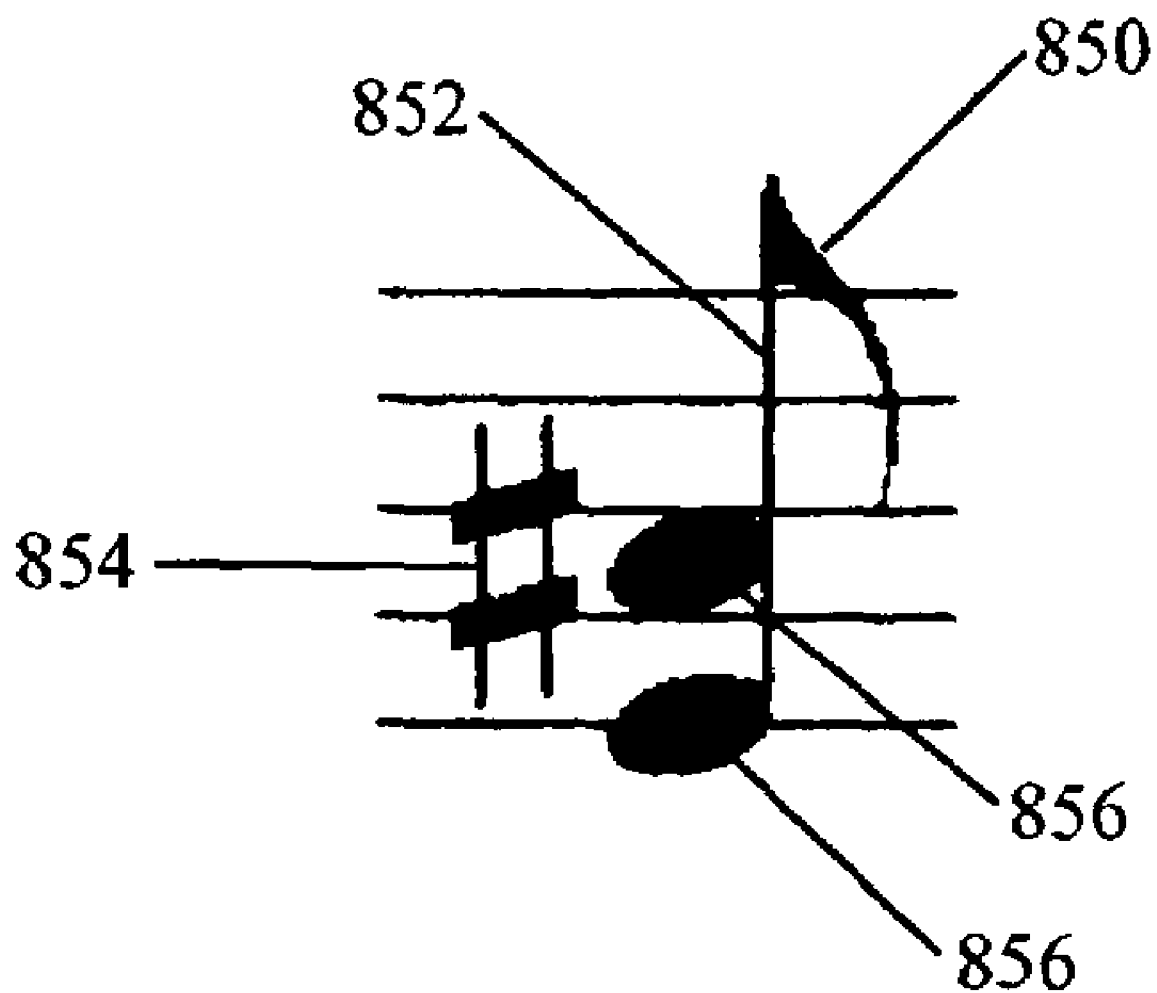
FIG. 8 illustrates an example of a set of notation objects representing the display of some music symbols.

A simple example using the music symbols shown in FIG. 8, an encoded NIFF file versus an encoded EMSF file 514 is given to emphasize the compactness and efficiency of EMSF files 514. In a NIFF file the following six notation elements plus time slice information for each element would define the music symbols shown in FIG. 8. The entire data file would be read to ensure that all elements for a given grouping have been found. Once read, each element is assembled with its associated time slice and vertical position information to render the displayed music symbols.

Element 1: Stem Chunk 852

Element 2: Logical or Absolute Placement of Tag (indicates stem direction)

Element 3: Number of Flags (indicates number of flags on the stem) 850

Element 4: Notehead Chunk (for bottom notehead) 858

Element 5: Notehead Chunk (for top notehead) 856

Element 6: Accidental Chunk (indicates sharp on the top notehead) 854

In an EMSF file 514 for the example of FIG. 8, two notation objects plus their start times define the displayed music symbols. The two objects assembled with their start time and staff position information are encoded in a particular measure, part 612 and voice 614. Efficiency is gained by reading only the data from the specified measure in which these objects are located.

Notation Object 1: Filled notehead 856 (bottom) with upstem 852 and one flag 850

Notation Object 2: Filled notehead 856 (top) with upstem 852, one flag 850, and one sharp 854

Figure 9:
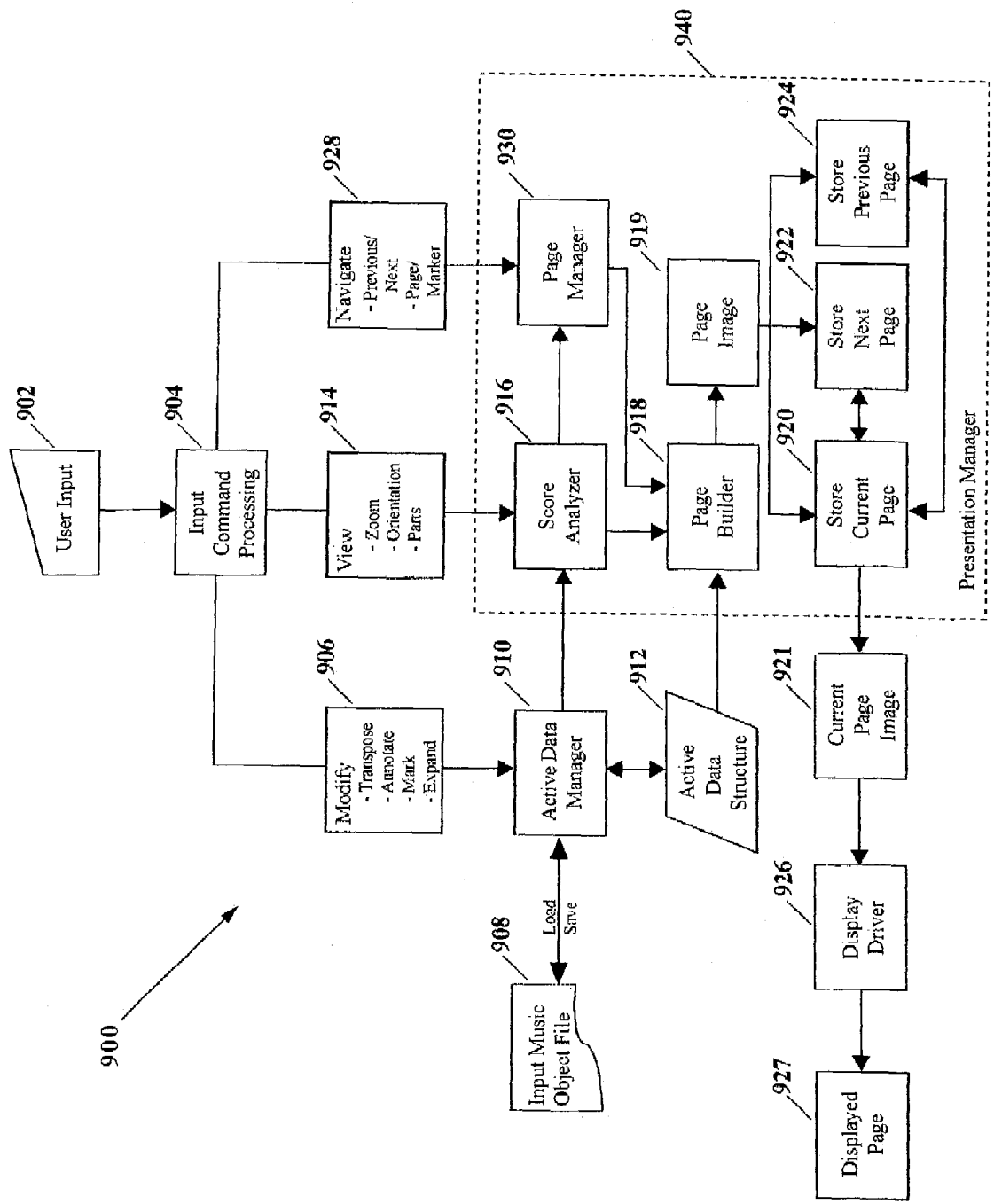
FIG. 9 is a block diagram of a preferred embodiment of a method for displaying and manipulating music object files.

FIG. 9 is a functional block diagram of a preferred embodiment of a method 900 for displaying and manipulating an input music object file 908. The input music object file 908 includes music data structures in accordance with the preferred EMSF music file 514 format. User input 902 is provided primarily by touch input to a touch screen 110 display. User input 902 may also be provided by other input devices, including control buttons, a key pad, footswitch 404 or remote master unit 304. Input command processing 904 provides command inputs for manipulation operations including modify command input 906, view command input 914, and navigate command input 928. Presentation manager 940 constructs a current page image 921 for display driver 926 and responds to commands corresponding to view 914 and navigate 928. Display driver 926 produces a displayed page 927 from the current page image 921 for the display 108. The operation of a display driver 926 is known to those of ordinary skill in the art.

Active data manager 910 selects an input music object file 908, preferably in EMSF format, for display according to a modify command input 906. The active data manager 910 extracts music data structures from the input music object file 908 to form active data structures 912. The active data manager 910 can change the active data structures 912 in accordance with the modify command input 906, including commands to transpose, annotate, expand, and mark the music score. The active data manager 910 provides the active data structures 912 to the presentation manager 940.

Score analyzer 916 and page builder 918 use the active data structures 912 to form a page image 919. Page image 919 may be stored as a current page 920 and provide a current page image 921 for display driver 926. Alternatively, page image 919 can be stored as a next page 922 or a previous page 924, depending on its position relative to the current page image 921. While the current page image 921 is displayed as the displayed page 927, presentation manager 940 prepares a page image 919 and stores it as the next page 922. When the user advances through the music score by one page, the current page 920 will replace the previous page 924, the next page 922 will replace the current page image 921 and be stored as current page 920, and the page image 919 just formed will be stored as the new next page 922. This arrangement provides for timely display as the user navigates the music score. A greater number of additional pages may be stored in preparation for display as memory capacity permits. This would allow efficient use of the processor 102 for building page images 919.

Score analyzer 916 analyzes the active data structures 912 for each measure of music in the input music object file 908. Score analyzer 916 assigns each measure to a line and a page for the particular view options selected by the user. Page manager 930 receives navigation command input 928 for selecting a page of the music score for display. Page manager 930 provides at least one page selection parameter to page builder 918. Page builder 918 uses the page selection parameter from page manager 930 and measure, line and page assignments from the score analyzer 916 to select the appropriate music data structures from the active data structures 912 for the page image 919.

Figure 10:
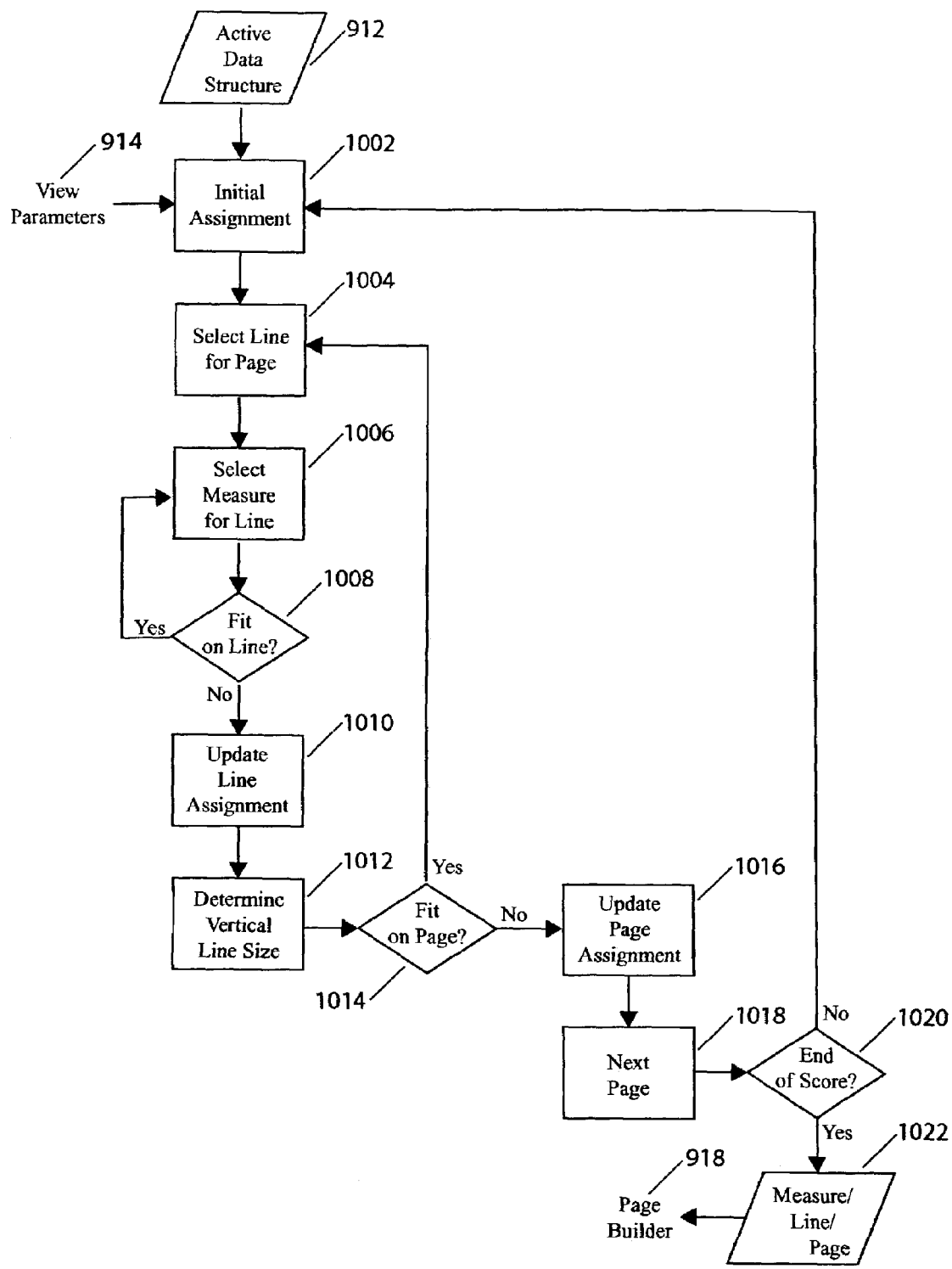
FIG. 10 is a block diagram of a preferred embodiment of a method for analyzing a music object file.

FIG. 10 is a block diagram of a preferred embodiment of score analyzer 916. Input to score analyzer 916 includes the active data structures 912 and view command input 914. Score analyzer 916 makes an initial assignment 1002 of a measure to a line of music and a page using line and page layout information 603 extracted during the translation of the original music score file 500 to EMSF format. Score analyzer 916 produces a measure/line/page table 1022 including updated line and page assignments of each measure.

Selecting a measure for a line 1006 in a preferred embodiment is described herein. For each measure, the corresponding active data structures 912 are analyzed to determine a horizontal size of the measure. In a preferred embodiment, a horizontal size parameter of a measure is determined using time slices of the measure and width attributes of notation objects in the measure as follows:

a. For each time slice in the measure, determine the maximum width of the notation objects for the parts 612 of that time slice to give a time slice width;

b. Add the time slice widths for each time slice in the measure to give the horizontal size parameter for the measure.

To test if the measure fits on the line 1008, the horizontal size parameter is added to the horizontal size parameters of any previously selected measures for that line. If the sum is less than the horizontal size of the line, the measure is selected for the line and the next measure is tested. Once the measures are assigned to a particular line, the line assignments for the selected measures are updated 1010.

Once the line is complete, the page assignment for the measures contained in that line is determined. In a preferred embodiment, the vertical size of the line is determined 1012 by analyzing vertical position data in the active data structures 912 for the measures contained in that line. The EMSF format includes a vertical position on the staff for a notation object, as indicated in Table 2. In a preferred embodiment, a vertical size parameter for a line of music is determined as follows:

c. Determine the maximum vertical position and the minimum vertical position of the notation objects in the measures assigned to the line of music;

d. Subtract the minimum vertical position from the maximum vertical position to give the vertical size parameter for the line.

The line and the measures it includes are selected for a page if its vertical size parameter added to the vertical size parameters of any previously selected lines for that page is less than the vertical size of the page, represented by the fit on page 1014 block. If the line fits on the page, the next line selected 1004 is tested for fit on the page. Once all the lines are selected for a particular page, the page assignment of the measures in the selected lines is updated 1016. Measures and lines are then selected for the next page 1018. Once the end of score 1020 is reached, the score analyzer 916 completes the updated measure/line/page assignment table 1022 that includes the assigned line and assigned page for each measure in the score.

Score analyzer 916 responds to view parameters derived from view command input 914 in the calculations for measure/line/page assignments. For a resizing command, the associated view parameter corresponds to a template size. The template size indicates the scale of the displayed notation objects. The score analyzer calculates the measure/line/page assignments for the selected template size. Since the horizontal size parameter of a measure depends on template size, the resulting line assignments for the measures can be different for different template sizes. Also, the maximum vertical position and the minimum vertical position of the notation objects in a line and the associated vertical size parameter can be different for different template sizes. The resulting measure/line/page assignments are appropriate for the selected sizing. For the orientation option, score analyzer 916 applies horizontal and vertical page size parameters that correspond to portrait and landscape orientations. Score analyzer 916 responds to the view part command 914 by selecting active data structures 912 in each measure that correspond to the user selected part 612. The organization of the EMSF data structure includes a PART chunk, as indicated in Table 2, which facilitates part 612 selection.

The active data manager 910 makes modifications to the active data structure according to a command to modify 906 the music score. Modifications 906 include transpose, annotate, expand, and mark. For the transpose operation, the active data manager 910 creates an active data structure with modifications in accordance with a musical transposition. For an annotation 530, the active data manager 910 manages the bitmap annotation image data and associated pointers to music data structures corresponding to the annotated notation objects. In response to a user request, the active data manager 910 creates an annotation file for storing bitmap annotation image data and associated pointer data. For marking a music score, the active data manager 910 maintains a table of marker positions relative to measures of the music score. For expanding a repeated portion of the music score, the active data manager 910 manages access to music data structures for the repeated portion at the appropriate point within the music score.

Figure 11:
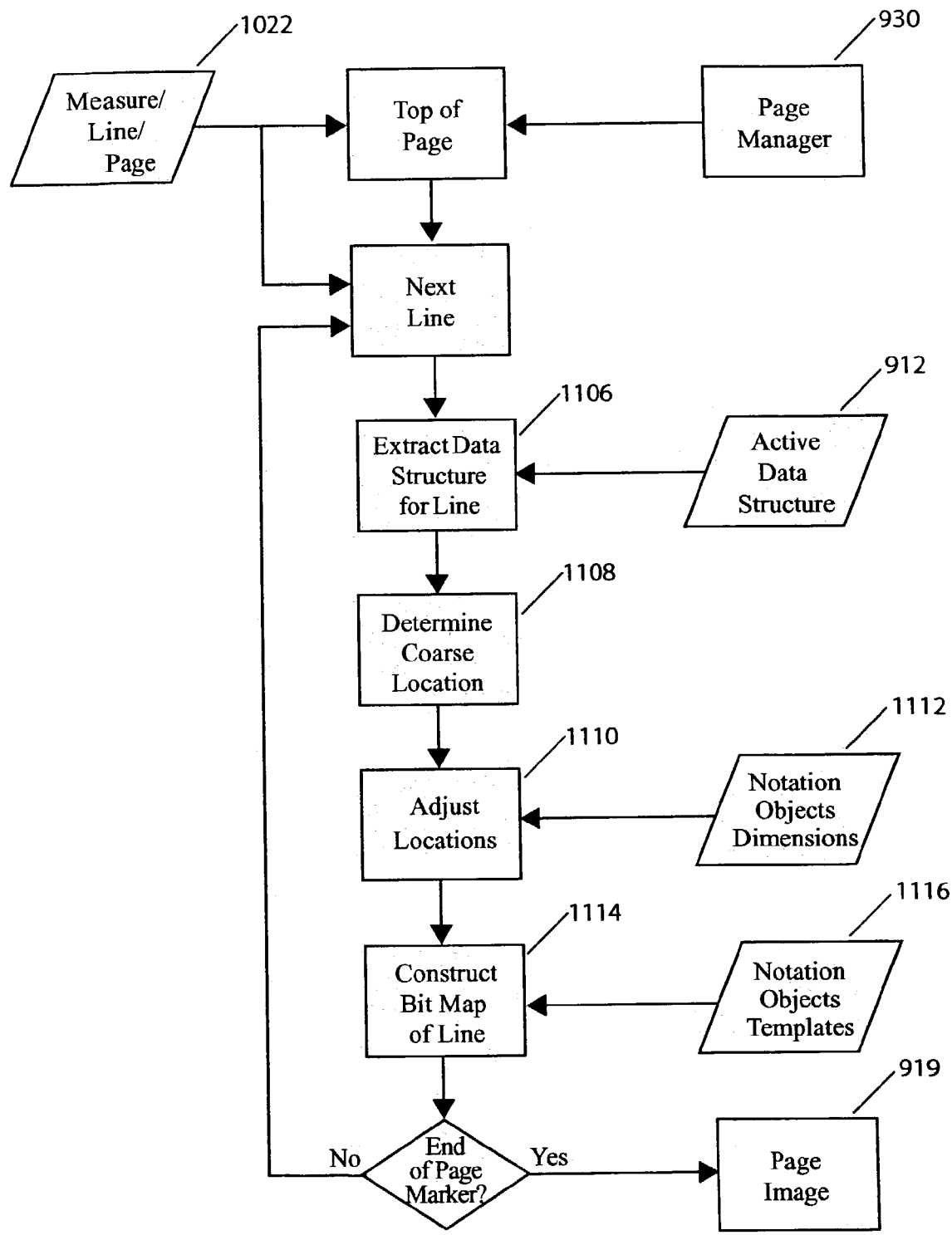
FIG. 11 is a block diagram of a preferred embodiment of a method for building a page image.

FIG. 11 is a block diagram of a preferred embodiment of the page builder 918. The page builder 918 uses the page selection parameter from the page manager 930 and the measure/line/page assignment table 1022 from the score analyzer 916 to identify the top line for the page image 919. A preferred embodiment builds the page image 919 line by line. For each line, the data structures corresponding to the notation objects in the line are extracted 1106 from the active data structures 912. The relative location of a measure within the line and the relative location of the line within the page are indicated by the measure/line/page table 1022. The relative location of the notation object within a measure is indicated by the "start time" for the horizontal location and by the "staff number" for the vertical location. These parameters are included in the preferred EMSF format and are listed in the VOIC chunk description section in Table 11. A coarse location for each notation object is determined 1108 using the relative locations of the notation object within the measure, the measure within the line and the line within the page. The coarse locations of the notation objects in the line are checked for spacing problems. Spacing problems can include the notation objects being too close, overlapping or being too widely spaced. The locations of the notation objects are adjusted 1110 to resolve spacing problems. The notation objects dimensions 1112 table provides predetermined dimensional parameters in the horizontal and vertical directions used for adjusting locations 1110. An example of correcting overlap of two notation objects is described as follows:

a. Determine a coarse x,y location of a first notation object b. Determine a footprint by adding the horizontal dimensional parameter to the x-coordinate and the vertical dimensional parameter to the y-coordinate. This produces a rectangular footprint of the object at its x,y location.

c. Perform steps a and b for a second notation object.

d. Check the footprints for overlap in the x and y directions.

e. If there is overlap, adjust the x,y locations of the first and/or second notation objects so that the rectangular footprints are separated by a predetermined distance.

Other approaches to location adjustment 1110 may be easily applied by those skilled in the art without undue experimentation.

In a preferred embodiment, a bit map of the line is constructed 1114 by applying a corresponding notation object template from a set of notation object templates 1116 at the corresponding location in the page image 919. The notation object templates 1116 are predetermined and stored in system memory 104. A template is represented as a bit map of the shape of the corresponding notation object, a descriptor for the shape which is decoded to form a bit map of the notation object for placement in the page image 919, or a combination of a bit map and a descriptor. Techniques for forming templates for shapes of objects are well known to those of ordinary skill in the arts and can be applied without undue experimentation.

The page image 919 is formed line by line by applying templates for the notation objects in each line. The page image 919 can be stored as a current page 920 and provide a current page image 921 for display. Alternatively, the page image 919 can be stored as a next page 922 or stored as a previous page 924.

While various embodiments of the present invention have been described in detail, it is apparent that numerous modifications and adaptations of these embodiments will occur to those skilled in the arts without departing from the spirit and scope of the present invention. However, it is expressly understood that such modifications and adaptations are within the scope of the present invention. It is to be understood that no limitation with respect to the present invention described herein is intended or should be inferred so that the scope of the present invention shall be determined only by what is recited in the present appended claims and their equivalents.

What is claimed is:

1. An electronic music display appliance for displaying a music score, wherein said music score includes a plurality of notation objects, comprising:

a memory for storing an EMSF music object file, said EMSF music object file comprising a plurality of EMSF music data structures, wherein each EMSF music data structure corresponds to a corresponding notation object of said music score;

a processor coupled to said memory for retrieving said EMSF music object file from said memory and for forming a page image of said music score using at least one of said plurality of EMSF music data structures; and a touch sensitive display for displaying said page image to form a displayed page, wherein said touch sensitive display is responsive to a touch input and said appliance is responsive to said touch input to said touch sensitive display for modifying said music score.

2. The music display appliance as claimed in claim 1, wherein:

said appliance is responsive to said touch input for selecting said notation object and marking said displayed page with an annotation associated with said notation object and forming an annotated notation object.

3. The music display appliance as claimed in claim 2, wherein:

said processor determines an indicator for a corresponding EMSF music data structure from said plurality of EMSF music data structures corresponding to said annotated notation object associated with said annotation and said processor forms an annotation data structure for representing said annotation and said indicator.

4. The music display appliance as claimed in claim 2, wherein:

said processor determines an annotation location for said annotation in said displayed page to maintain a predetermined relative position of said annotation to said annotated notation object.

5. The music display appliance as claimed in claim 3, wherein:

said processor forms an annotation image using said annotation data structure and said touch sensitive display for displaying said annotation image on said displayed page to form an annotated displayed page wherein said annotation is overlaying said music score in said annotated displayed page.

6. The music display appliance as claimed in claim 5, wherein:

said touch sensitive display removes said annotation image from said annotated displayed page in response to a user input.

7. The music display appliance as claimed in claim 5, wherein:

said processor changes a size of said annotation image in accordance with a command to resize said music score.

8. The music display appliance as claimed in claim 2, further comprising:

a stylus for providing said touch input.

9. The music display appliance as claimed in claim 2, wherein:

said touch sensitive display is responsive to said touch input provided by a user's finger.

10. The music display appliance as claimed in claim 1, wherein:

said memory stores a plurality of EMSF music object files and said appliance is responsive to said touch input for selecting a selected one of said plurality of EMSF music object files for processing.

11. The music display appliance as claimed in claim 1, wherein:

said processor converts a music score file corresponding to said music score into said EMSF music object file.

12. The music display appliance as claimed in claim 1, further comprising:

a removable memory module interface coupled to said processor for retrieving said EMSF music object file stored on a memory module.

13. The music display appliance as claimed in claim 1, further comprising:

an image memory coupled to said processor and to said touch sensitive display for storing at least one additional page image of said music score.

14. The music display appliance as claimed in claim 13, wherein:
said image memory stores a previous page image to said displayed page.

15. The music display appliance as claimed in claim 13, wherein:
said image memory stores a next page image to said displayed page.

16. The music display appliance as claimed in claim 1, further comprising:
at least one data interface coupled to said processor.

17. The music display appliance as claimed in claim 16, wherein:
said data interface couples said appliance to a remote page turning device.

18. The music display appliance as claimed in claim 16, wherein:
said data interface communicates with a remote music display appliance, wherein said appliance is responsive to said remote appliance for modifying said music score.

19. The music display appliance as claimed in claim 18, wherein:
said appliance receives said EMSF music object file from said remote appliance.

20. The music display appliance as claimed in claim 18, wherein:
said appliance is responsive to said remote appliance for annotating said music score.

21. The music display appliance as claimed in claim 18, wherein:
said appliance is responsive to said remote appliance for navigating said music score.

22. The music display appliance as claimed in claim 16, wherein:
said data interface couples said appliance to a computer.

23. The music display appliance as claimed in claim 1, wherein:
said appliance is responsive to said touch input for resizing a portion of said music score.

24. A method for displaying a music score electronically, wherein said music score includes a plurality of notation objects, comprising the steps of:
providing a plurality of EMSF music data structures, wherein each EMSF music data structure corresponds to a corresponding notation object from said plurality of notation objects;
forming a page image of said music score using at least one of said plurality of EMSF music data structures;
displaying said page image on a touch sensitive display to form a displayed page; and
responding to a touch input to said touch sensitive display to modify said music score.

25. The method of claim 24 wherein the step of forming a page image comprises, for each notation object for said page image, the steps of:
selecting at least one corresponding EMSF music data structure corresponding to said notation object from said plurality of EMSF music data structures;
determining a location for said notation object in said page image;
selecting an object template from a predetermined set of templates in accordance with said corresponding EMSF music data structure, wherein said object template corresponds to a shape of said notation object; and
applying said object template to said location to form a notation image of said notation object at said location in said page image.

26. The method of claim 24 wherein the step of forming a page image comprises the step of:
selecting a measure based subset of EMSF music data structures from said plurality of EMSF music data structures wherein said measure based subset corresponds to said notation objects in a measure of music in said music score.

27. The method of claim 26 further comprising the steps of:
determining a measure size parameter of said measure of music using said measure based subset of EMSF music data structures; and
selecting said measure of music for said page image based on said measure size parameter.

28. The method of claim 24 wherein the step of forming a page image comprises the step of:
selecting a line based subset of EMSF music data structures from said plurality of EMSF music data structures, wherein said line based subset corresponds to said notation objects in a line of music in said music score.

29. The method of claim 28, wherein the step of selecting a line based subset comprises the steps of:
selecting a measure based subset of EMSF music data structures from said plurality of EMSF music data structures wherein said measure based subset corresponds to said notation objects in a measure of music in said music score;
determining a measure size parameter of said measure of music using said measure based subset of EMSF music data structures; and
selecting said measure of music for said line of music based on said measure size parameter.

30. The method of claim 28, further comprising the steps of:
determining a vertical size parameter of said line of music using said line based subset of EMSF music data structures; and
selecting said line of music for said page image based on said vertical size parameter.

31. The method of claim 24, wherein the step of providing a plurality of EMSF music data structures comprises the step of:
retrieving said plurality of EMSF music data structures from a EMSF music object file.

32. The method of claim 24, further comprising the step of:
storing said plurality of EMSF music data structures in a EMSF music object file.

33. The method of claim 24, further comprising the step of:
responding to said touch input for selecting said notation object and marking said displayed page with an annotation associated with said notation object and forming an annotated notation object.

34. The method of claim 33, further comprising the steps of:
determining an indicator for a corresponding EMSF music data structure from said plurality of EMSF music data structures corresponding to said annotated notation object associated with said annotation; and forming an annotation data structure for representing said annotation and said indicator.

35. The method of claim 34, further comprising the step of:

determining an annotation location for said annotation in said displayed page to maintain a predetermined relative location of said annotation to said annotated notation object.

36. The method of claim 34, further comprising the steps of:

forming an annotation image using said annotation data structure; and displaying said annotation image on said displayed page on said touch sensitive display to form an annotated displayed page wherein said annotation is overlaying said music score in said annotated displayed page.

37. The method of claim 36, further comprising the step of:

removing said annotation image from said annotated displayed page in response to a user input.

38. The method of claim 36, further comprising the step of:

changing a size of said annotation image in accordance with a command to resize said music score.

39. The method of claim 34, further comprising the step of:

storing said annotation data structure in an annotation file.

40. The method of claim 24, wherein the step of responding to a touch input comprises the step of:

resizing a portion of said music score.

* * * * *